United States Patent [19]
Hill et al.

[11] Patent Number: 5,498,030
[45] Date of Patent: Mar. 12, 1996

[54] AIR BAG MODULE

[75] Inventors: Timothy W. Hill, Troy; Mark A. Oleszko, Warren, both of Mich.; Graham T. Spencer, Tipp City; John P. Sparkman, Dayton, both of Ohio

[73] Assignee: General Motors Corporation, Detroit, Mich.

[21] Appl. No.: 413,706

[22] Filed: Mar. 28, 1995

[51] Int. Cl.⁶ ..................................................... B60R 21/20
[52] U.S. Cl. ..................... 280/743.1; 280/728.1; 280/728.2; 280/730.2
[58] Field of Search ............... 280/728.1, 729, 280/743.1, 728.2, 728.3, 731, 732, 730.2, 730.1

[56] References Cited

U.S. PATENT DOCUMENTS

| | | | |
|---|---|---|---|
| 4,360,223 | 11/1982 | Kirchoff | 280/729 |
| 4,565,535 | 1/1986 | Tassy | 280/728.1 X |
| 5,022,675 | 6/1991 | Zelenak, Jr. et al. | 280/743.1 |
| 5,240,282 | 8/1993 | Wehner et al. | 280/728.1 |
| 5,393,090 | 2/1995 | Shepherd et al. | 280/743.1 |
| 5,398,958 | 3/1995 | Taggart | 280/728.2 |
| 5,435,597 | 7/1995 | Warner | 280/728.2 |

FOREIGN PATENT DOCUMENTS

0558271  9/1993  European Pat. Off. ........... 280/728 A

*Primary Examiner*—Christopher P. Ellis
*Attorney, Agent, or Firm*—Kathryn A. Marra; Howard N. Conkey

[57]  ABSTRACT

An air bag module includes an inflator for generating gas and an air bag coupled to the inflator and deployable upon generation of gas by the inflator. A pouch is made of a fabric material and serves as both the housing and cover of the module. The pouch has wall portions surrounding the air bag and inflator and defining a pouch interior containing the inflator and the air bag substantially therein such that the inflator and the air bag are housed within the pouch. The pouch also is provided with a frangible seam being breakable to form a pouch deployment opening. Upon air bag deployment, the air bag breaks open the frangible seam of the pouch to permit deployment of the air bag out through the pouch deployment opening such that the pouch guides the air bag during deployment.

13 Claims, 9 Drawing Sheets

AIR BAG MODULE

This invention relates to an air bag module for attachment to a vehicle.

BACKGROUND OF THE INVENTION

Conventional air bag module designs a rigid container-type housing which is anchored to or integrally formed on a vehicle body and which houses an inflator and a folded air bag. The housing typically serves as a chute through which inflator gas passes and also assists with directing deployment of the air bag. The housing is typically formed of a sturdy rigid material, such as a heavy plastic or stamped, drawn or cast metal. The air bag module also typically includes a plastic or molded cover door which covers the folded air bag and which breaks open to permit deployment of the air bag.

These conventional air bag modules require a housing and a cover that are specifically shaped and designed for packaging within the spacial constraints of a particular instrument panel, door panel, or vehicle seat. Thus, each air bag module requires separate manufacturing, tooling and design resulting in a variety of modules which are specific to a certain vehicle or vehicle location.

In addition, the packaging constraints are tight for the air bag module, particularly when located inside vehicle seats or vehicle door panels. Thus, the module typically approaches the surface such that the rigid housing or cover may cause stiff points, which are undesirable, especially for seating comfort of an occupant.

SUMMARY OF THE INVENTION

This invention provides an improved air bag module which has a reduced number of components, which is lightweight, and which is easily adaptable for packaging in a vehicle. In addition, this module advantageously does not require a rigid housing or cover, but instead has a soft feel such that stiff points in the vehicle are eliminated. In addition, this soft module is easily adaptable for use in many parts of the vehicle, without requiring specially designed vehicle structure in a vehicle. This soft module is particularly well-adapted for use in a vehicle seat.

In a preferred embodiment of the invention, the module includes an inflator for generating gas and an air bag coupled to the inflator and deployable upon generation of gas by the inflator. A pouch is made of a fabric material and serves as both the housing and cover of the module. The pouch has wall portions surrounding the air bag and inflator. The wall portions defining a pouch interior containing the inflator and the air bag substantially therein such that the inflator and the air bag are housed within the pouch. The pouch also is provided with a frangible seam being breakable to form a pouch deployment opening. Upon air bag deployment, the air bag breaks open the frangible seam of the pouch to permit deployment of the air bag out through the pouch deployment opening such that the pouch guides the air bag during deployment. Preferably, mounting studs are secured to the inflator and extend outwardly therefrom to protrude out through the pouch for attachment to the vehicle to anchor the module to the vehicle.

In another preferred form of the invention, the air bag is made of an air bag fabric and includes a partially folded deployment portion and a pouch portion being a continuous extension of the air bag fabric. The pouch portion of the air bag forms the pouch of the module without the addition of any extra parts during assembly. Thus, the pouch portion completely encloses the inflator and the deployment portion of the air bag therein.

According to another aspect of the invention, the pouch may also be made of fabric material which is completely separate and independent from the air bag.

The present invention is characterized by providing simplicity, reduction of weight and parts, easily adaptable packaging, and increased comfort in seat-mounted modules.

BRIEF DESCRIPTION OF THE DRAWINGS

An embodiment of the present invention is described below, by way of example only, with reference to the accompanying drawings in which.

DESCRIPTION OF THE PREFERRED EMBODIMENT

Figure 1:
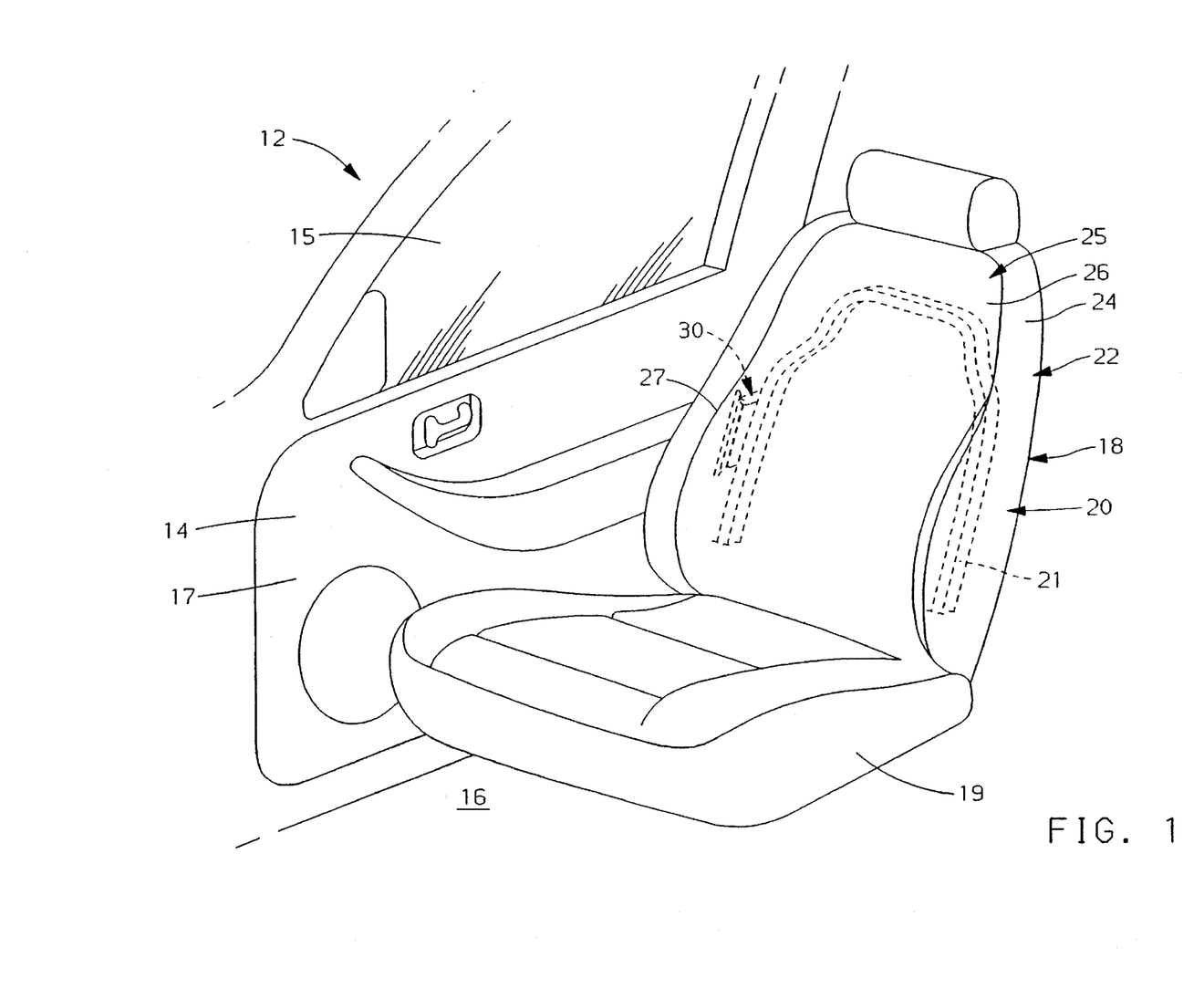
FIG. 1 is a perspective view of a vehicle interior partially broken away and including an air bag module in an undeployed condition and located in a seat.

Referring to FIG. 1, it is seen that a vehicle 12 includes a door 14 having a movable window 15 mounted thereon. An interior 16 of the vehicle 12 includes an inner door panel 17 and a seat 18 for a vehicle occupant, the seat 18 having a seat bottom portion 19 and an upper seat back portion 20. The upper seat back portion 20 includes a rigid seat frame rail 21, preferably being metal, and encompassed within a cushion portion 22 of the seat back 20. The cushion portion 22 is preferably formed of a foam material 23 covered by fabric seat material 24 defining the contour of the outer surface 25 of the seat back 20. A front 26 of the outer surface 25 of the seat back 20 includes a vertically extending frangible seat seam 27 proximate the inner door panel 17.

Figure 5:
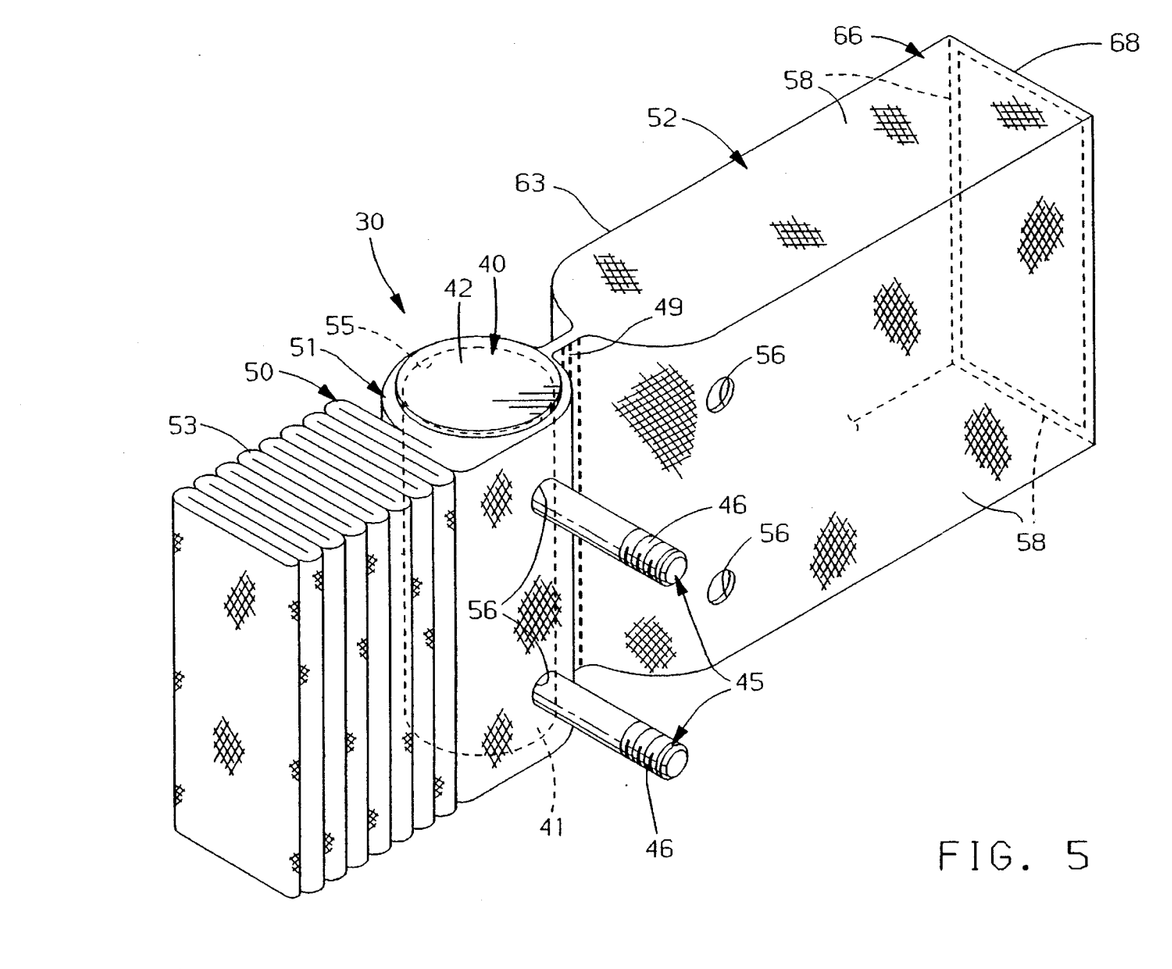
FIG. 5 is a perspective view of the air bag module in a partially assembled condition.

FIG. 5 best illustrates the component parts of a complete air bag module, generally designated as 30. The module 30 includes an inflator 40, an air bag 50 having a partially folded deployment portion 51 and a pouch portion 52, and mounting studs 45 extending from the inflator 40 for mounting the entire module 30 to any suitable vehicle structure.

Figure 3:
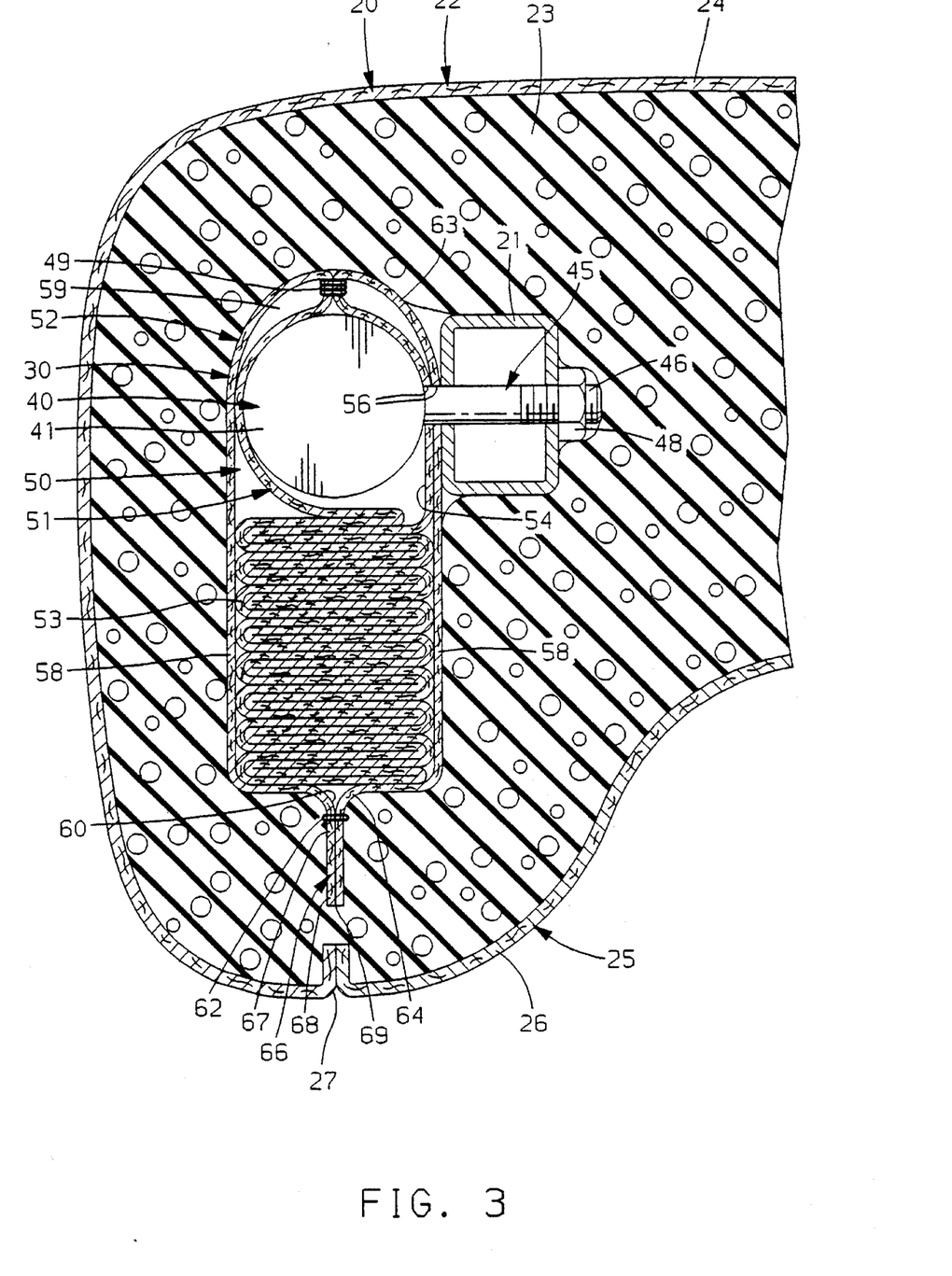
FIG. 3 is a sectional view of a preferred embodiment of the air bag module located in the seat and in the undeployed condition.
Figure 4:
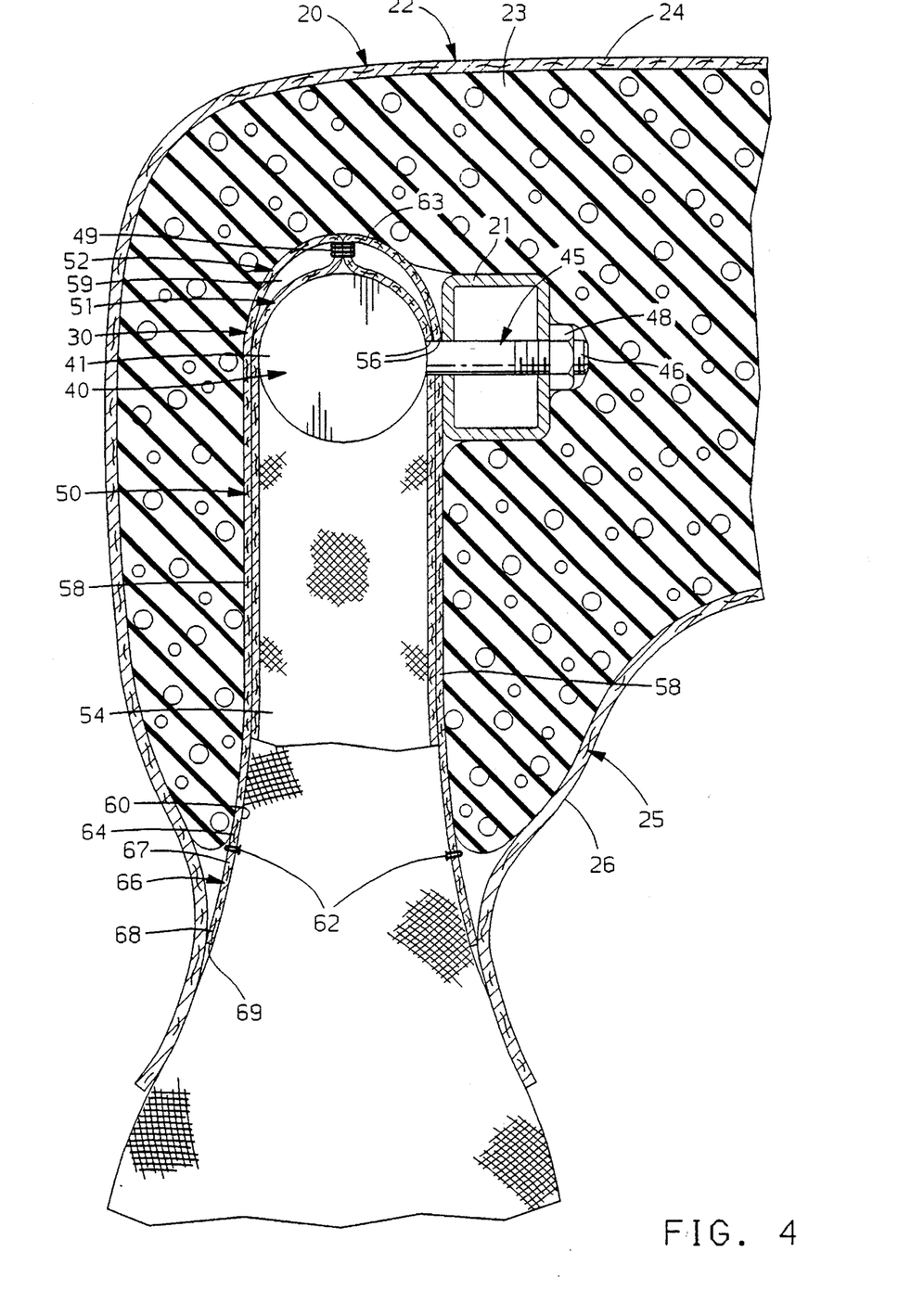
FIG. 4 is a view similar to FIG. 3, but showing the air bag module in the deployed condition.

As best shown in FIGS. 3–5, the inflator 40 may be of any conventional construction which contains chemicals for igniting to generate gas for discharge upon the existence of predetermined vehicle conditions. The inflator 40 is rigid and preferably has an axially elongated cylindrical body 41 including ports (not shown) through which the inflator gas discharges to inflate the air bag 50 and includes an inflator end 42.

The elongated mounting studs 45 are secured to the body 41 of the inflator 40 and extend radially outwardly therefrom for attachment to any suitable vehicle structure, such as the seat frame rail 21. The mounting studs 45 preferably each have a threaded end 46 for receiving a nut 48 thereon, as shown in FIGS. 3 and 4.

As best shown in FIG. 5, the air bag 50 is made of a fabric material which is suitable for air bag construction. The air bag 50 includes the partially folded deployment portion 51 which is inflatable upon the discharge of inflator gas. The deployment portion 51 includes folds 53 which are oriented forwardly on the module 30 for deployment in a forwardly direction. The deployment portion 51 may be made of a single piece of fabric or of several fabric panels joined together, such as by sewing.

The air bag 50 also includes the pouch portion 52 made of the fabric material. The pouch portion 52 is integrally formed with the air bag 50 and is preferably made of the fabric which is a continuous extension of the fabric of the deployment portion 51 of the air bag 50, as best shown in FIG. 5. Thus, the pouch portion 52 is a continuous extension of the air bag 50 and advantageously does not need to be joined thereto during manufacture of the air bag 50.

The air bag 50 further includes a nonbreakable closure seam 49 sewn axially across the air bag 50 at the intersection of the deployment portion 51 and the pouch portion 52 to prevent inflator gas from escaping from the deployment portion 51 out through the pouch portion 52 during inflation of the deployment portion 51, as described further hereinafter. Thus, the deployment portion 51 defines an enclosed air bag interior 54 having a side opening 55 which is suitably sized for receiving the inflator 40 including the mounting studs 45 therethrough. The deployment portion 51 and the pouch portion 52 each include matably aligned stud apertures 56 in the fabric through which the mounting studs 45 outwardly protrude for attachment to the vehicle 12, as will be described further hereinafter. It will be appreciated that slits (not shown) may be used to extend the length of the stud apertures 56 to assist with insertion of the mounting studs 45 therethrough during assembly.

Figures 6, 10:
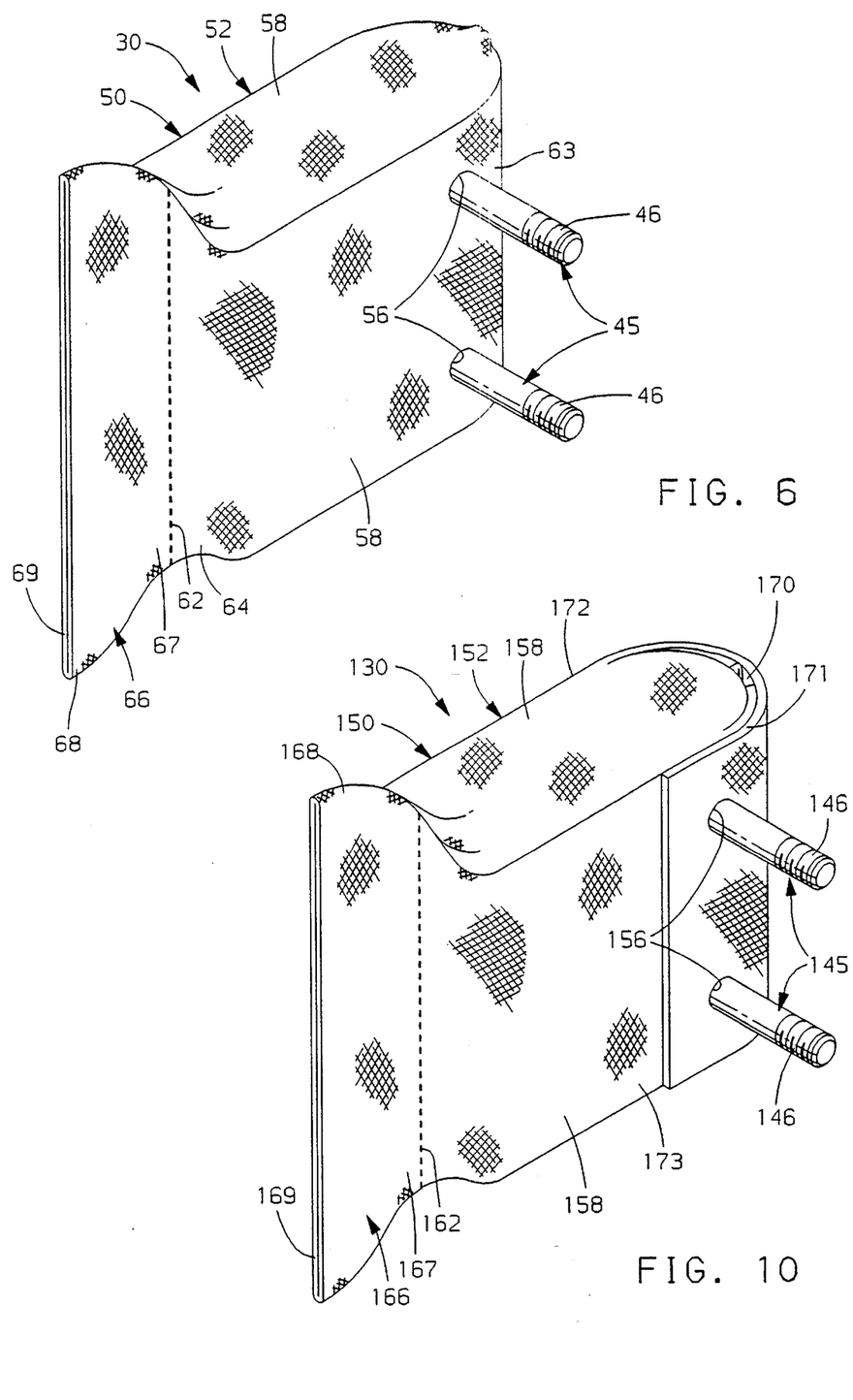
FIG. 6 is a perspective view similar to FIG. 5, but showing the air bag module in the fully assembled condition.
FIG. 10 is a view similar to FIG. 6, but showing the alternate embodiment of FIG. 7.

Referring to FIG. 6, it is seen that the fabric pouch portion 52 of the air bag 50 is a continuous extension of the fabric of the deployment portion 51 of the air bag 50. The pouch portion 52 has side wall portions 58 defining an enclosed pouch interior 59 including a frangible pouch seam 62 which closes a pouch deployment opening 60. Thus, a first end portion 63 of the pouch portion 52 is defined by the nonbreakable closure seam 49 adjacent the inflator 40 and an opposite second end portion 64 of the pouch portion 52 is defined by the frangible pouch seam 62.

As best shown in FIGS. 5 and 6, the pouch portion 52 of the air bag 50 is turned inside out during assembly to form the enclosed pouch interior 59 which completely encloses, houses, and covers the inflator 40 and the deployment portion 51 of the air bag 50. The side wall portions 58 are sized for closely surrounding the inflator 40 and deployment portion 51 of the air bag 50. The frangible pouch seam 62 is adjacent and overlying the folds 53 of the deployment portion 51 of the air bag 50 such that the frangible pouch seam 62 is breakable upon deployment of the air bag 50 to define the pouch deployment opening 60 through which the deployment portion 51 of the air bag 50 deploys, as shown in FIG. 4.

Referring to FIGS. 4 and 6, the pouch portion 52 preferably also includes an integral chute portion 66 extending forwardly beyond the frangible pouch seam 62 and having a closed end 67 adjacent the frangible pouch seam 62 and an opposite open free end 68. The free end 68 of the chute portion 66 defines a chute opening 69 as best shown in FIG. 4. The chute portion 66 guides the deployment portion 51 of the air bag 50 during deployment, as described below.

The entire module 30 is located completely within the cushion portion 22 of the seat back 20 and is mounted to the seat frame rail 21. Prior to deployment, the frangible pouch seam 62 of the pouch portion 52 is preferably aligned with the frangible seat seam 27 of the seat back 20. The frangible pouch seam 62 and the folds 53 of the deployment portion 51 are located proximate the outer surface 25 of the seat 18, while the rigid inflator 40 is oriented away from the outer surface 25 of the seat 18. Thus, the module 30 only has soft fabric components facing the outer surface 25 of the seat 18 such that any stiff points caused by the rigid components such as the housing and cover normally found in prior art modules are eliminated. Advantageously, this enables the module 30 to be located closely beneath the outer surface 25 of the seat 18 while maintaining the comfort of the seat 18 for the occupant.

Referring to FIGS. 5 and 6, the air bag module 30 is assembled as follows. The fabric of the air bag 50 is provided with the deployment portion 51 having the side opening 55, the continuously extending pouch portion 52, and the nonbreakable closure seam 49 sewn across the air bag 50 at the intersection of the deployment and pouch portions 51, 52 to separate the air bag and pouch interiors 54, 59, respectively. To couple the air bag 50 to the inflator 40, the inflator 40 and the mounting studs 45 secured to the inflator 40 are axially inserted through the side opening 55 in the deployment portion 51 of the air bag 50 until the inflator 40 is substantially contained within the enclosed air bag interior 54 of the deployment portion 51. The fully inserted inflator 40 may have the inflator end 42 extending out beyond the side opening 55. When the inflator 40 is inserted into the air bag 50, the mounting studs 45 are matably aligned with the stud apertures 56 in the deployment portion 51 of the air bag 50 and the threaded ends 46 of the mounting studs 45 are pushed outwardly therethrough. Thus, the air bag 50 substantially surrounds the inflator 40 and is securely coupled to the inflator 40 to be held in position thereby during deployment. The folds 53 in the deployment portion 51 of the air bag 50 may be made either prior to or after insertion of the inflator 40 and temporarily secured in place by a temporary clip device (not shown) or manually.

During further assembly, the continuously extending fabric pouch portion 52 of the air bag 50 is turned inside out and wrapped around the inflator 40 and deployment portion 51 of the air bag 50 such that the inflator 40 and the deployment portion 51 of the air bag 50 are contained within the pouch interior 59 of the pouch portion 52 of the air bag 50. When wrapping around the pouch portion 52, the stud apertures 56 of the pouch portion 52 become aligned with the mounting studs 45 and the threaded ends 46 are pushed outwardly therethrough such that the mounting studs 45 protrude out through both the deployment portion 51 and the pouch portion 52 of the air bag 50.

As best shown in FIG. 6, the frangible pouch seam 62 is sewn closely adjacent and forward the folds 53 of the air bag 50 to close the deployment opening 60 of the pouch portion 52 such that the pouch portion 52 forms the enclosed pouch interior 59 housing the inflator 40 and the deployment portion 51 of the air bag 50. The chute portion 66 of the pouch portion 52 extends forwardly beyond the frangible pouch seam 62. In the assembled condition shown in FIG. 6, the closely surrounding side wall portions 58 of the pouch portion 52 maintain the folds 53 of the air bag 50 in the folded condition.

It is significantly noted that the pouch portion 52 is the outermost layer of the module 30 and replaces both the housing and the cover of the conventional module and also guides the air bag 50 during deployment. It is also noted that the air bag module 30 including the inflator 40, the mounting studs 45 connected to the inflator 40, and the air bag 50 including the continuously extending fabric pouch portion 52 forms the entire air bag module 30 and is sufficiently sturdy for storage or transport to a vehicle assembly location.

The air bag module 30 may be installed in a vehicle 12 by simply attaching the easily accessible mounting studs 45 to any suitable rigid vehicle 12 structure. For example as shown in FIG. 3, the mounting studs 45 are each inserted through the seat frame rail 21 of the seat back 20 and secured in place by a nut 48, thus securely coupling the inflator 40 and thus the module 30 to the vehicle 12. The module 30 is preferably surrounded by the foam material 23 of the cushion portion 22 of the seat back 20 and oriented with the frangible pouch seam 62 and chute portion 66 in alignment with the frangible seat seam 27. The chute opening 69 of the pouch portion 52 is preferably in an open condition, but is merely temporarily held closed in FIGS. 3 and 6 as is accomplished the surrounding foam material 23 of the cushion portion 22 of the seat back 20.

Referring to FIG. 4, upon actuation the inflator 40 discharges inflator gas in a forwardly direction towards the folds 53 of the air bag 50 to inflate the deployment portion 51 of the air bag 50. The deployment portion 51 of the air bag 50 expands and breaks open the frangible pouch seam 62 such that the air bag 50 may deploy out through the deployment opening 60 of the pouch portion 52. The inflating air bag 50 also deforms the foam material 23 of the cushion portion 22 and breaks open the frangible seat seam 27 such that the air bag 50 deploys out through the chute portion 66 and the chute opening 69 and out beyond the outer surface 25 of the seat 18. In the fully inflated condition shown in FIG. 2, the air bag 50 is positioned adjacent the inner door panel 17 to provide side protection for the vehicle occupant.

It will be appreciated that during air bag 50 deployment, the pouch portion 52 including the chute portion 66 guides the deployment direction of the air bag 50 during inflation. Since the inflator 40 is located substantially within the air bag 50, it will also be appreciated that inflator gas is discharged directly into the air bag interior 54 of the deployment portion 51 thereby maximizing utilization of gas for air bag 50 inflation. In addition, the nonbreakable closure seam 49 at the intersection of the deployment portion 51 and pouch portion 52 of the air bag 50 prevents inflator gas from escaping out through the pouch portion 52 during inflation of the deployment portion 51.

It is apparent that a flexible heat shield material or coating (not shown) may be provided inside the deployment portion 51 of the air bag 50 adjacent the inflator 40, to protect the air bag 50 from heat typically associated with actuation of the inflator 40.

FIGS. 7–10 show an alternate embodiment of an air bag module 130 in which a fabric pouch 152 is separate and independent from an air bag 150.

Figure 9:
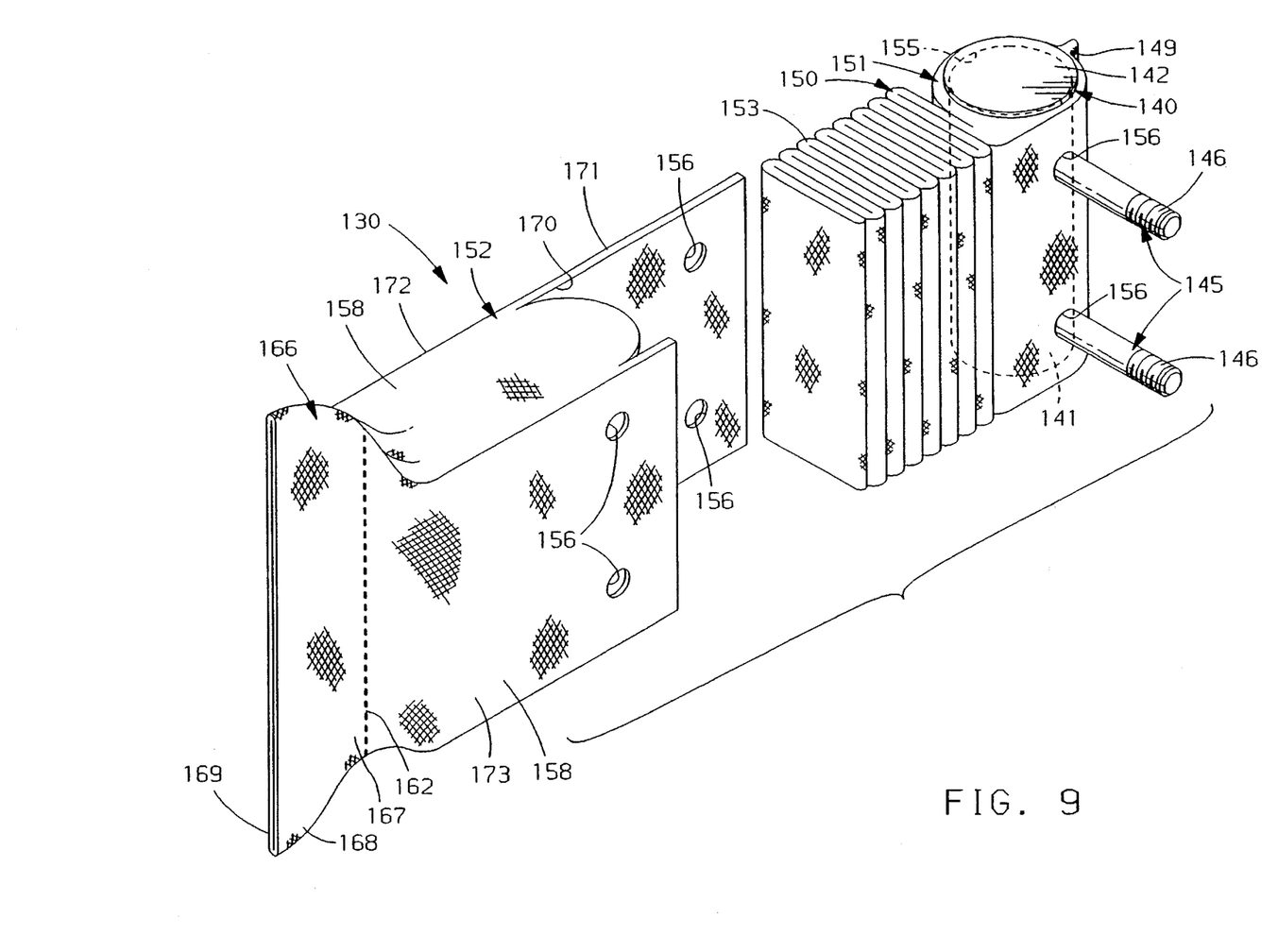
FIG. 9 is a perspective view of the alternate embodiment of FIG. 7 and showing a partially exploded view of the module in a partially assembled condition.

FIG. 9 illustrates a partially exploded view of the complete air bag module 130. The component parts include an inflator 140, mounting studs 145 secured to the inflator 140, the air bag 150, and the fabric pouch 152.

Figure 2:
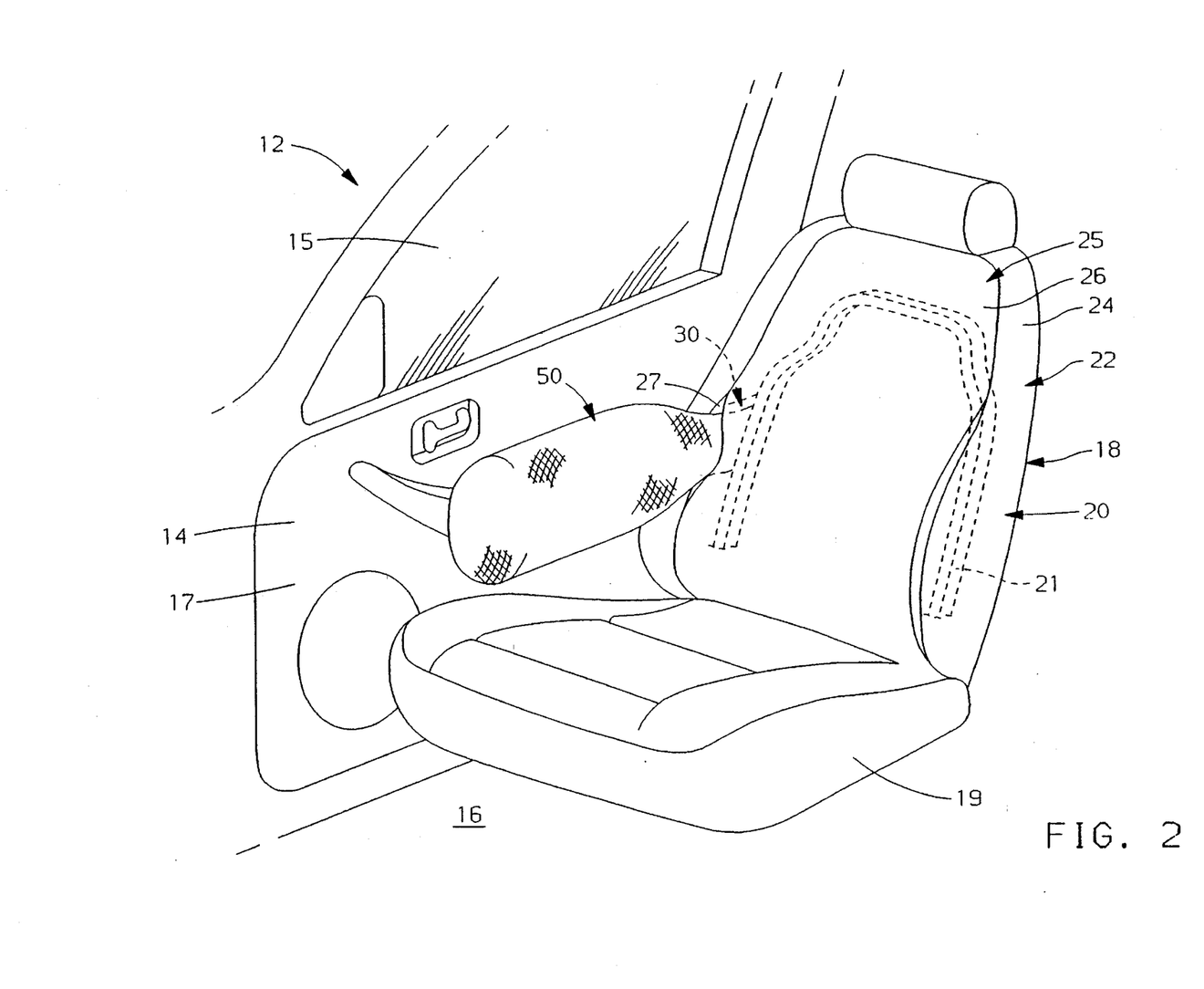
FIG. 2 is a view similar to FIG. 1 but showing the air bag module in a deployed condition.

The above description regarding the vehicle 12 having a vehicle interior 16 shown in FIGS. 1 and 2 is equally applicable to the module 130 of the alternate embodiment and similar components will be referred to with similar numerals.

The inflator 140 is similar to that shown in FIGS. 3–6 and includes an axially elongated cylindrical body portion 141 and an inflator end 142. The mounting studs 145 having threaded ends 146 are also similar to those described above, and extend radially outwardly from and are secured to the body 141 of the inflator 140.

In this particular embodiment, the air bag 150 is made of a fabric material which is suitable for air bag construction. The air bag 150 includes folds 153 which are oriented forwardly on the module 130 for deployment in a forwardly direction. The air bag 150 may be made of a single piece of fabric or several panels of fabric joined together, such as by sewing. The air bag 150 preferably includes a nonbreakable closure seam 149 sewn axially across the rearward portion of the air bag 150. Thus, the air bag 150 defines an enclosed air bag interior 154 having a side opening 155 which is suitably sized for receiving the inflator 140 including the mounting studs 145 therethrough. The air bag 150 includes stud apertures 156 through which the mounting studs 145 outwardly extend and protrude for attachment to the vehicle 12, as will be described further hereinafter.

Figure 8:
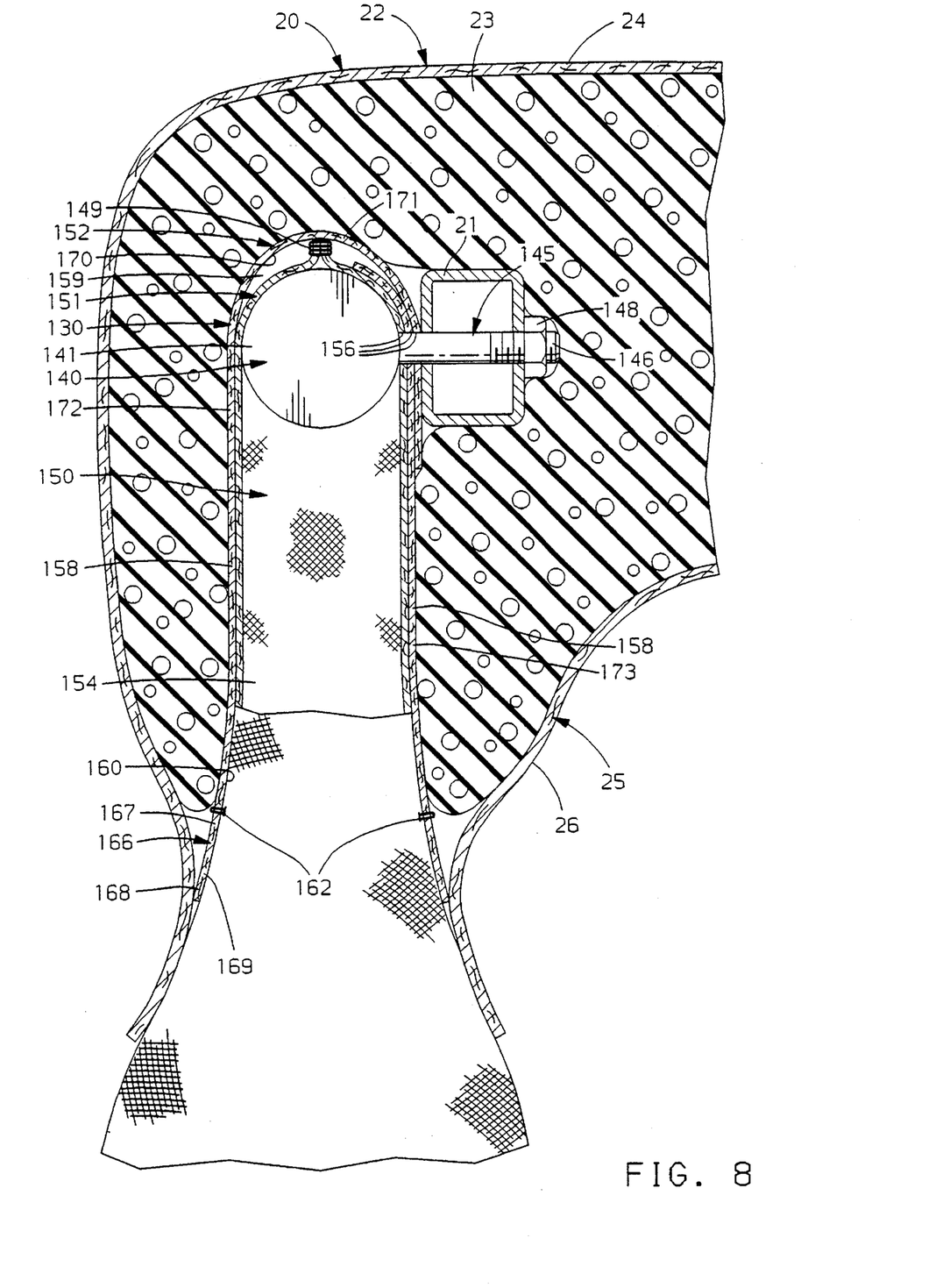
FIG. 8 is a view similar to FIG. 4, but showing the alternate embodiment of FIG. 7.

Referring to FIGS. 9 and 10, the pouch 152 is made of fabric material. The fabric may be the same type as that of the air bag 150. However, in this particular embodiment, the pouch 152 is formed completely separate and independent from the fabric forming the air bag 150. The pouch 152 has side wall portions 158 defining an enclosed pouch interior 159 having a pouch deployment opening 160 closed by a frangible pouch seam 162. The side wall portions 158 are sized for closely surrounding the inflator 140 and the air bag 150 to maintain the folds 153 of the air bag 150 in the folded condition. The frangible pouch seam 162 is adjacent and overlying the folds 153 of the air bag 150 such that the frangible pouch seam 162 is breakable upon deployment of the air bag 150 to open the pouch deployment opening 160 through which the air bag 150 deploys, as shown in FIG. 8.

Referring to FIG. 9, the side wall portions 158 of the pouch 152 define a rearward insertion opening 170 for receiving the inflator 140 and the air bag 150 within the pouch 152, as described below. A flap portion 171 extends from a first side portion 172 of the side wall portions 158 and is adapted to overlap an opposing second side portion 173 of the side wall portions 158 to close the insertion opening 170 such that the pouch 152 completely surrounds, encloses, and houses the inflator 140 and the air bag 150. The flap portion 171 and the second side portion 173 of the side wall portions 158 each include a pair of stud apertures 156 therethrough which matably align for receiving the threaded ends 146 of the mounting studs 145 therethrough when the flap portion 171 overlaps the second side portion 173 of the side wall portions 158 to close the insertion opening 170.

Referring to FIGS. 9 and 10, the pouch 152 also includes an integral chute portion 166 extending forwardly beyond the frangible pouch seam 162 and having a closed end 167 adjacent the frangible pouch seam 162 and an opposite open free end 168. The free end 168 of the chute portion 166 defines a chute opening 169, best shown in FIG. 8.

Similar to the module 30 in FIGS. 3–7, the entire air bag module 130 is located completely within the cushion portion 22 of the seat back 20 and is mounted to the seat frame rail 21 with the frangible pouch seam 162 in alignment with the frangible seat seam 27 of the seat back 20. This alternate embodiment of the module 130 also has only soft fabric components facing the outer surface 25 of the seat 18 for maintaining the comfort of the seat 18 for the occupant.

Referring to FIGS. 9 and 10, the module 130 is assembled as follows. The air bag 150 is provided with a closed air bag interior 154 except for the side opening 155 and stud apertures 156. To couple the air bag 150 to the inflator 140, the inflator 140 and the mounting studs 145 secured to the inflator 140 are axially inserted through the side opening 155 in the air bag 150 such that the inflator 140 is substantially contained within the enclosed air bag interior 154 with the mounting studs 145 extending out through the stud apertures 156 in the air bag 150 as shown in FIG. 9. The folds 153 in the air bag 150 are made either prior to or after insertion of the inflator 140 and temporarily held in place.

During further module 130 assembly, the air bag 150 and inflator 140 are inserted through the insertion opening 170 of the pouch 152 and into the pouch interior 159 of the pouch 152 with the folds 153 of the air bag 150 leading such that the folds 153 are aligned beneath the frangible pouch seam 162 of the pouch 152 and the mounting studs 145 protrude out through the stud apertures 156 in the second side portion 173. Next, the flap portion 171 of the pouch 152 is wrapped around to overlap the second side portion 173 of the side wall portions 158 and the stud apertures 156 in the flap portion 171 are hooked over the mounting studs 145 such that the insertion opening 170 is closed by the flap portion 171. It will be appreciated that this embodiment of the module 130 is advantageous for assembly since the sewing operations are completed early in the assembly process and no seams need be sewn after insertion of the inflator 140 and air bag 150 into the pouch 152 since the flap portion 171 simply hooks over the mounting studs 145.

As shown in the fully assembled condition in FIG. 10, the flap portion 171 is held in place by the mounting studs 145 and the air bag 150 is maintained in the folded condition by the closely surrounding pouch 152. The module 130 is sufficiently sturdy for storage or transport to a vehicle assembly location. It is significantly noted that the fabric pouch 152 replaces the conventional housing and cover and also guides deployment of the air bag 150.

Figure 7:
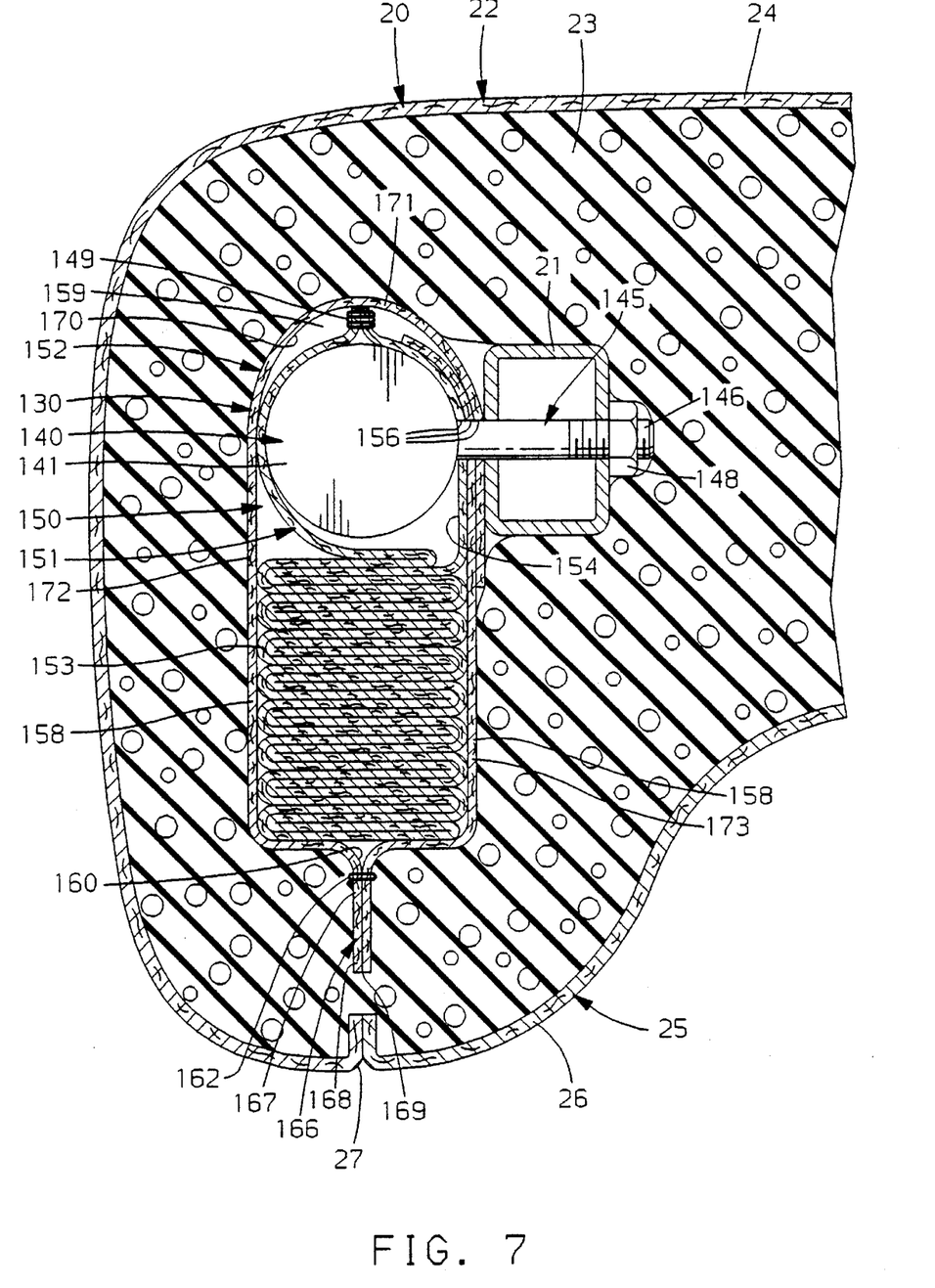
FIG. 7 is a sectional view similar to FIG. 3, but showing an alternate embodiment of an air bag module.

Referring to FIGS. 7 and 8, the air bag module 130 is installed in the vehicle 12 as follows. The mounting studs 145 are each inserted through the seat frame rail 21 of the seat back 20 and secured in place by a nut 148, thus securely coupling the inflator 140 and thus the module 130 to the vehicle 12. The module 130 is preferably surrounded by the cushion portion 22 and oriented with the frangible pouch seam 162 and chute portion 166 in alignment with the frangible seat seam 27, similar to the embodiment in FIG. 3. In this particular embodiment, the attachment of the mounting studs 145 traps the flap portion 171 between the inflator 140 and the seat frame rail 21 of the vehicle 12 such that the pouch 152 remains securely closed during air bag 150 inflation.

Referring to FIG. 8, upon actuation the inflator 140 discharges inflator gas and the air bag 150 expands and breaks open the frangible pouch seam 162 such that the air bag 150 deploys out through the deployment opening 160 of the pouch 152. The inflating air bag 150 also deforms the foam material 23 of the cushion portion 22 and breaks open the frangible seat seam 27 such that the air bag 150 deploys out through the chute portion 166 and the chute opening 169 and out beyond the outer surface 25 of the seat 18, similar to the module 30 in FIG. 3. The pouch 152 including the chute portion 166 guides the deployment direction of the air bag 150 during inflation.

Thus referring to the embodiments of the invention shown above, it will be appreciated that the module 30, 130 according to the present invention greatly reduces the number of parts which must be handled during assembly of the air bag module 30, 130. Advantageously, the inflator 40, 140 and mounting studs 45, 145 are handled as a single part during module assembly. Thus, the entire module 30, 130 has only two or three parts handled during assembly, being the inflator 40, 140, the air bag 50, 150, and the fabric pouch 152 when separate from the air bag 150. It is also apparent that there are no fasteners, such as screws, bolts, or rivets required during the module 30, 130 assembly which reduces assembly time.

Also advantageously, attachment of the entire module 30, 130 to the vehicle 12 requires a minimum number of components. The module 30, 130 may be mounted to any existing rigid vehicle structure and does not require any specially designed vehicle support structure. Only two nuts 48, 148 are required to secure the module 30, 130 to the vehicle 12 during assembly of the module 30, 130 to the vehicle. Thus, the placement and packaging of the air bag module 30, 130 in the vehicle 12 is extremely flexible.

It will further be appreciated the module 30, 130 is extremely lightweight since the fabric pouch 52, 152 including the frangible pouch seam 62, 162 replaces the rigid housing and housing cover normally associated with prior art air bag modules. Also, since the air bag 50, 150 and pouch 52, 152 are coupled with the inflator 40, 140 by substantially surrounding the inflator 40, 140, there are no cushion retainers or inflator retainer components required. Also advantageously, the module 30, 130 of the present invention is softer than prior art modules since most of the rigid components, except the inflator 40, 140, are eliminated. In addition, the inflator 40, 140 in the present invention is oriented away from the outer surface 25 where deployment occurs and separated therefrom by the soft fabric air bag 50, 150 and pouch 52, 152. Thus, the module 30, 130 may be packaged closer to the outer surface 25 of the vehicle seat 18 or inner door panel 17 while still being soft for the vehicle occupant. It will also be appreciated that this soft module 30, 130 can be attached to any piece of rigid vehicle structure including a seat frame rail 21, an door beam inside the door, or any vehicle body rails such as a B-pillar, roof rail or instrument panel support structure, without redesigning the module 30, 130.

It will further be appreciated that tooling costs are greatly reduced since the air bag 50, 150 and pouch 52, 152 which serve as the housing and cover are made of fabric and do not require any expensive tooling development as is required for metal and plastic components. This also greatly reduces lead time to put the module 30, 130 into production since the air bag 50, 150 shape, inflator 40, 140 size, mounting stud 45, 145 size, and pouch 52, 152 size are all easily and quickly changed to accommodate various types of occupant protection. This module 30, 130 is advantageous since design changes can be quickly made without making significant structural changes to the vehicle 12. Thus, this module 30, 130 is very adaptable for incorporation into existing vehicles 12 with reduced lead time.

It will be understood that a person skilled in the art may make modifications to the embodiments shown herein within the scope and intent of the claims.

For example, when the fabric pouch 152 is independent of the air bag 150, the pouch 152 can be made of one piece of fabric or any number of integrally joined fabric pieces which define the enclosed pouch interior 159 for housing the inflator 140 and air bag 150 as long as the pouch 152 includes a frangible pouch seam 162 which breaks open to permit deployment of the air bag 150. For example, the pouch 152 could be a generally rectangular single piece of fabric which is folded in half and sewn on two sides with nonbreakable seams and on one side with the frangible pouch seam 162 through which the air bag 150 deploys.

While the present invention has been described as carried out in a specific embodiment thereof, it is not intended to be limited thereby but is intended to cover the invention broadly within the scope and spirit of the appended claims.

The embodiments of the invention in which an exclusive property or privilege is claimed are defined as follows:

1. An air bag module for attachment to a vehicle, the module comprising:

an inflator for generating gas;

an air bag coupled to the inflator and deployable upon generation of gas by the inflator;

a pouch made of a fabric material, the pouch having wall portions surrounding the air bag and inflator, the wall portions defining a pouch interior containing the inflator and the air bag substantially therein such that the inflator and the air bag are housed within the pouch, the pouch including a frangible seam being breakable to define a pouch deployment opening; and the pouch including a fabric chute portion being a continuous extension of the fabric material of the pouch and extending beyond the frangible seam, the chute portion having a first end adjacent the frangible seam and an opposite free end;

whereby upon air bag deployment, the air bag breaks open the frangible seam of the pouch to permit deployment of the air bag out through the pouch deployment opening and the chute portion of the pouch such that the pouch guides the air bag during deployment.

2. The module of claim 1 wherein the fabric material forming the pouch is completely separate and independent from the air bag.

3. The module of claim 2 wherein the wall portions of the pouch cooperatively define an insertion opening through which the air bag and the inflator are insertable into the pouch, and wherein the pouch includes closure means for closing the insertion opening.

4. The module of claim 3 wherein the closure means includes a flap portion extending from one of the wall portions of the pouch and adapted to overlap another of the wall portions to close the insertion opening.

5. An air bag module for attachment to a vehicle, the module comprising:

an air bag made of an air bag fabric and including a partially folded deployment portion and a pouch portion being a continuous extension of the air bag fabric forming the deployment portion of the air bag;

an inflator for generating gas to inflate the deployment portion of the air bag, the inflator substantially positioned within the deployment portion of the air bag; and the pouch portion of the air bag having wall portions surrounding the deployment portion of the air bag and the inflator, the wall portions defining an enclosed pouch interior housing the inflator and the deployment portion of the air bag therein, the pouch including a frangible seam being breakable to define a pouch deployment opening;

whereby upon air bag deployment, the air bag breaks open the frangible seam of the pouch portion to permit deployment of the air bag out through the pouch deployment opening such that the pouch portion guides the air bag during deployment.

6. The module of claim 5 wherein the air bag includes a nonbreakable seam sewn across the air bag at the intersection of the deployment portion and the pouch portion to prevent inflator gas from escaping out through the pouch portion during air bag inflation.

7. The module of claim 5 wherein mounting means are secured to the inflator and extend outwardly therefrom the mounting means protruding out through the deployment portion and the pouch portion for attachment to the vehicle to anchor the module to the vehicle, and wherein the mounting means includes a plurality of elongate mounting studs extending outwardly from the inflator, the mounting studs each having one end anchored to the inflator and another opposite end protruding out through the deployment portion and the pouch portion for attachment to the vehicle.

8. The module of claim 7 wherein the inflator has an axially elongated cylindrical body and wherein the mounting studs extend radially outward from the body of the inflator and out through the deployment portion and pouch portion for attachment to the vehicle.

9. The module of claim 5 wherein the pouch portion includes a fabric chute portion being a continuous extension of the air bag fabric of the pouch portion and extending out beyond the frangible seam, the chute portion having a first end adjacent the frangible seam and an opposite free end, whereby upon deployment of the air bag, the deployment portion breaks the frangible seam and deploys out through the chute portion of the pouch portion and is guided thereby during air bag deployment.

10. An air bag module for attachment to a vehicle, the module comprising:

an inflator for generating gas;

an air bag coupled to the inflator, the air bag having a folded portion positioned forward the inflator for deployment in a forwardly direction;

a pouch made of a fabric material, the pouch having opposing wall portions defining an enclosed pouch interior containing the air bag and inflator therein, the pouch including a frangible seam overlying the folded portion of the air bag, the wall portions defining a rearwardly insertion opening through which the air bag and inflator are insertable into the pouch, one of the wall portions including a flap portion extending therefrom and adapted to overlap another of the wall portions to close the insertion opening; and the pouch including a fabric chute portion being a continuous extension of the fabric material of the pouch and extending beyond the frangible seam, the chute portion having a first end adjacent the frangible seam and an opposite free end;

whereby upon air bag deployment, the air bag breaks open the frangible seam of the pouch to permit deployment of the air bag out through the chute portion of the pouch and is guided thereby during deployment.

11. A method of making an air bag module comprising the steps of:

a. providing a fabric air bag having a deployment portion including a side opening and a pouch portion being a continuous extension of the fabric of the deployment portion;

b. sewing a nonbreakable seam along the intersection of the deployment portion and the pouch portion;

c. inserting an inflator through the side opening into the deployment portion of the air bag;

d. turning the pouch portion of the air bag inside out such that the pouch portion contains the inflator and deployment portion therein; and e. sewing a frangible seam to close the pouch portion.

12. An air bag module for attachment to a vehicle, the module comprising:

an inflator for generating gas;

an air bag coupled to the inflator and deployable upon generation of gas by the inflator, the air bag being made of air bag fabric; and a pouch made of a fabric material, the fabric material of the pouch being a continuous extension of the air bag fabric such that the air bag and pouch are formed from the same continuously extending air bag fabric, the pouch having wall portions surrounding the air bag and inflator, the wall portions defining a pouch interior containing the inflator and the air bag substantially therein such that the inflator and the air bag are housed within the pouch, the pouch including a frangible seam being breakable to define a pouch deployment opening;

whereby upon air bag deployment, the air bag breaks open the frangible seam of the pouch to permit deployment of the air bag out through the pouch deployment opening such that the pouch guides the air bag during deployment.

13. An air bag module for attachment to a vehicle, the module comprising:

an inflator for generating gas;

an air bag coupled to the inflator and deployable upon generation of gas by the inflator; and a housing for housing the air bag and inflator, the housing being the outermost portion of the air bag module, the housing consisting of a pouch made of flexible fabric material, the pouch having wall portions surrounding the air bag and inflator, the wall portions defining a pouch interior containing the inflator and the air bag substantially therein, the pouch including a frangible seam being breakable to define a pouch deployment opening;

whereby upon air bag deployment, the air bag breaks open the frangible seam of the pouch to permit deployment of the air bag out through the pouch deployment opening such that the pouch guides the air bag during deployment.

* * * * *